United States Patent [19]

Huveteau

[11] Patent Number: 5,280,877
[45] Date of Patent: Jan. 25, 1994

[54] TAP ASSEMBLY RECIPROCAL POSITIONING ASSEMBLY

[75] Inventor: Jean L. Huveteau, Friville Escarbotin, France

[73] Assignee: Watts Investment Company, Wilmington, Del.

[21] Appl. No.: 11,325

[22] Filed: Jan. 29, 1993

[30] Foreign Application Priority Data

Jan. 30, 1992 [FR] France .................. 92 01426

[51] Int. Cl.$^5$ .................... F16K 31/64; F16K 1/00
[52] U.S. Cl. ......................... 251/321; 236/102
[58] Field of Search .......... 236/102; 251/319; 137/510; 251/323, 321

[56] References Cited

U.S. PATENT DOCUMENTS

| | | | |
|---|---|---|---|
| 1,737,755 | 12/1929 | Hamilton | 236/102 X |
| 2,693,200 | 11/1954 | Grayson | 236/102 X |
| 2,886,355 | 5/1959 | Wurzel | |
| 3,417,919 | 12/1968 | Baumann | 236/102 X |
| 4,562,953 | 1/1986 | Duprez et al. | |

FOREIGN PATENT DOCUMENTS

| | | |
|---|---|---|
| 1400862 | 3/1969 | Fed. Rep. of Germany . |
| 2450767 | 4/1976 | Fed. Rep. of Germany . |
| 829033 | 3/1960 | United Kingdom . |
| 1260523 | 1/1972 | United Kingdom . |
| 0279987 | 7/1988 | World Int. Prop. O. . |

Primary Examiner—Arnold Rosenthal
Attorney, Agent, or Firm—Fish & Richardson

[57] ABSTRACT

A tap assembly includes a body with a chamber having an inlet and an outlet, and a seat therebetween. A clapper is disposed for movement relative to the seat between a first position engaged upon the seat for resisting flow of fluid toward the outlet, and a second position of for permitting flow. The tap assembly also includes a reciprocal positioning assembly with a rod mounted for axial movement between a first position for allowing the clapper to engage upon the seat and a second position for precluding the clapper from engaging upon the seat; a cylindrical housing; and an elastically deformable elongated element which forms a split ring positioning unit for the rod. The positioning unit has an inner ring and an outer ring.

14 Claims, 1 Drawing Sheet

TAP ASSEMBLY RECIPROCAL POSITIONING ASSEMBLY

BACKGROUND OF THE INVENTION

The invention relates to tap assemblies, and more specifically to a reciprocal positioning assembly for a tap assembly.

Tap assemblies typically include a body which defines a fluid flow chamber into which at least two sleeves lead, one which is connected with an inlet and the other which is connected with an outlet, for flow of fluid. A third sleeve houses a pressure limiting means and clapper driving means. To control flow of fluid through the chamber, from the inlet toward the outlet, a clapper moves very nearly perpendicularly to a seat which is supported by the body at the lower end of a corresponding sleeve.

For the control of a tap or cock by a thermostatic feeler, the reciprocal positioning assembly is usually shaped like a rod, the end part of which penetrates into the body, and specifically into the sleeve, until, according to the temperature which has been detected, the feeler or rod has taken a position which allows the clapper to be closed, or which precludes the tap or cock from being shut.

The section of the feeler or rod is sufficiently large to resist any warping due to the force which it must exert on the clapper, without undergoing any buckling. However, the section must also be sufficiently reduced to provide an adequate passage within the sleeve through which the fluid can flow. Because of the difference between the inner diameter of the sleeve and the outer diameter of the end part of the feeler, the end part, when moved and translated, cannot be guided directly by the sleeve. The feeler, because of its length, requires a positioning means which operates with precision.

A rod positioning assembly located in a bore is well known in the art. An "elastic ring" or a "circlips" can only provide a thrust stop in an axial direction. The only positioning function it can ensure is along the axis. These "positioners" are inadequate when, in relation to the axis, a precise positioning is required on a radial plane. Neither can the positioners provide any effective guidance during a translation or transfer of the rod assembly.

The elastic ring is shaped like a radially split washer. Its outer or inner edge is then placed in the groove of a rod or a shaft. After the washer has been put into place, only one of its radial faces is operational. The other one, an inner or outer edge, is generally an irregular shape and remains free. Elastic rings shaped like wide washers are also known in the art. Because of their width, they adequately obstruct the space between the sleeve and the rod, but are insufficient to solve the guidance problem in any tap or cock assembly. This is because the washer, although it is split, would then substantially inhibit and prevent the flow. Instead of wide elastic rings in the shape of split washers, elastic positioners are known, made up with a short length of steel wire, the middle part of which is shaped like an open ring. This ring follows the outer edge of an elastic organ or part. From the edges of the ring opening, the extreme parts of the ring are pressed and folded down towards the inner zone of the ring on its level. The rings thus constitute inner branches, the ends of which are connected with the open ring, thus providing an interval or space between one and the other. Their other ends lean and are shored up, one against the other.

In addition to the lack of stability of the ring, misshaping, or material deformation, is also a problem. As a result, the ring cannot be used to position the rod in the sleeve or provide guidance during translations and transfers in a precise manner.

Accordingly, it is an object of the invention to provide a precise positioning operation. Another object of the invention is to ensure guidance when the rod is being translated.

SUMMARY OF THE INVENTION

According to a first embodiment of the invention, a tap assembly comprises a body defining a chamber having an inlet and an outlet, and a seat therebetween, and a clapper disposed for movement relative to the seat between a first position of the clapper engaged upon the seat for resisting flow of fluid from the inlet toward the outlet, and a second position of the clapper spaced from engagement upon the seat for permitting flow of fluid from the inlet toward the outlet. The tap assembly further comprises a reciprocal positioning assembly comprising: a rod mounted for axial movement between a first position of the rod for allowing the clapper to engage upon the seat and a second position of the rod for precluding the clapper from engaging upon the seat; a cylindrical housing; and an elastically deformable elongated element which forms a split ring positioning unit for the rod, the split ring positioning unit comprising an inner ring and an outer ring.

Preferred embodiments of the invention may include one or more of the following features. The tap assembly further comprises pressure limiting means for driving the clapper between its first and second positions. The outer ring of the split ring positioning unit cooperatively operates in a sleeve defined by the body. Preferably, the sleeve defines a groove which houses the outer ring. The rod cooperatively operates within the inner ring of the split ring positioning unit Ends of the elongated element which form the split ring positioning unit remain apart. Preferably, the angle formed between a center axis of the split ring positioning unit and its ends is approximately 60 degrees. The elongated element which forms the split ring positioning unit further forms radial branches which connect the inner ring and the outer ring Preferably, the intersections of the radial branches with the inner ring are characterized by wide angle, contoured, rounded off edges Also, spacing between the radial branches is greater than the difference between the diameter of the sleeve and the diameter of bottom of the groove. The elongated element is constructed of a wide strip. Preferably, the elongated element is constructed such that its width dimension is parallel to the thickness dimension of the positioning assembly, and the thickness of the elongated element is extremely small compared to the width dimension. More preferably, the thickness of the elongated element is substantially equal to the depth of the groove.

The present invention thus features a reciprocal positioning unit, part of an assembly comprising a rod- or trunk-shaped operating shaft and a cylindrical housing. At least one shaft is positioned in relation to the cylindrical housing with the help of the positioning unit.

The assembly is especially, but not exclusively, serviceable for tap and cock installations, and more specifically for taps controlled by a thermostatic probe or feeler.

The reciprocal positioning assembly of the invention is elongated, and its middle part is built so as to provide inner means which will cooperate with the feeler or rod. An inner, open ring surrounds the rod. The end parts of the elongated assembly extend outwardly, each one from one of the edges of the ring opening. The parts which extend are very nearly parallel to each other. They extend radially, up to near the outer open ring, where they diverge and extend in a virtually semi-circular shape. The end faces of the elongated element remain apart from one another. At least one rod is precisely positioned in the cylindrical housing of the locating unit.

Other features and advantages will be seen from the following description of a presently preferred embodiment, and from the claims.

DESCRIPTION OF THE PREFERRED EMBODIMENTS

Figure 1:
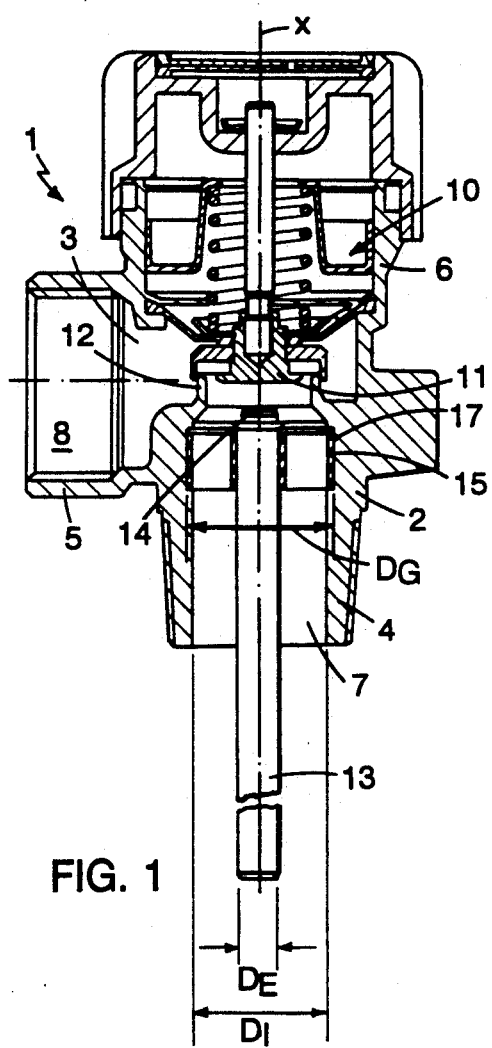
FIG. 1 is a top view of a tap or cock assembly with a reciprocal positioning assembly of the invention.

Referring to FIG. 1, the tap assembly 1 includes a body 2 which encloses a chamber 3. At least three sleeve portions 4, 5 and 6 of the body lead to the chamber 3, with sleeve 4 defining an entrance 7 and sleeve 5 defining an outlet 8. Sleeve 6 houses pressure-limiting means 10, which drives clapper 11. To control the flow and circulation of the fluid from chamber 3 and sleeve 4, clapper 11 moves axially (axis x) in a parallel direction to a seat 12. The seat 12 is supported by the body 2 in the region of the inner ends of sleeves 4 and 5.

To implement the driving operation, the tap or cock assembly 1 also includes a rod-shaped thermostatic feeler 13, the rod end 14 of which penetrates into the body 2, through sleeve 4.

Responsive to the temperature detected by the feeler 13, the feeler 13 has its rod end 14 positioned itself accordingly. In this manner, the rod 13 and 14 of feeler 13 either allows the clapper 11 to be closed or precludes a closing. The feeler 13 is wide and strong enough to resist buckling when it drives clapper 11, but also leaves an adequate passage within sleeve 4 through which the fluid flows. Due to the difference between the inner, diameter of sleeve 4 and the outer diameter, $D_E$, of the rod end 14 of feeler 13, the rod and of feeler 13 cannot be guided directly when it is translated or transferred through sleeve 4.

As the length of feeler 13 makes a precise positioning essential, the assembly includes a positioning unit 15 which has an outer shape like that of a split ring, and the unit is elastic, so that its shape can be changed.

Figure 2:
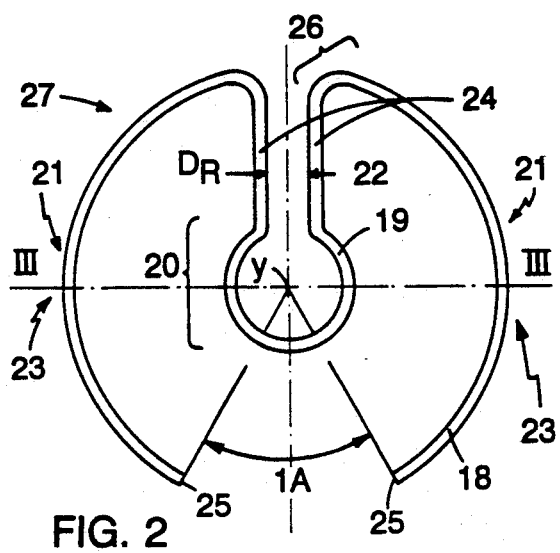
FIG. 2 is a front view of the reciprocal positioning assembly of FIG. 1.
Figure 3:
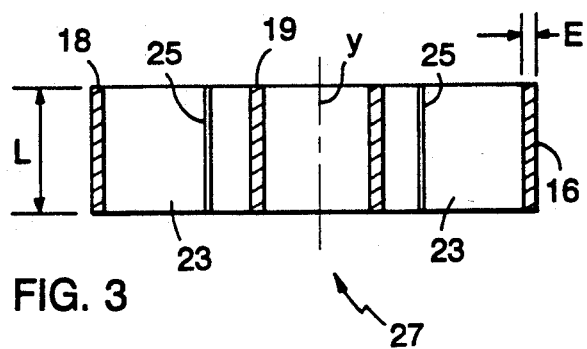
FIG. 3 is a sectional view taken along line 3—3 of FIG. 2.

Referring now to FIGS. 2 and 3, instead of an elastic ring shaped like a split washer, the positioning assembly has an elongated element 27. It is shaped so as to form an outer open ring 18 which cooperates with sleeve 4 and an inner ring 19 which cooperates with feeler 13. Its outer edge 16 can thus be introduced into a groove 17 of sleeve 4 or 5. The middle section 20 of the elongated element 27 is shaped so as to incorporate the inner ring 19 which cooperates with feeler 13. Consequently, the ends 21 of the elongated element 27 extend outwardly from edges 22, very nearly in a parallel direction. The ends 21 likewise extend in a radial direction up to and near outer open ring 18. The ends 21 diverge and continue to extend in a nearly semi-circular shape, creating two diametrically opposite semi-circular areas 23 of outer open ring 18. The end faces 25 of the elongated element 27 remain apart over a certain distance.

Due to the shape and strength of the elongated element 27, the deformation of the outer ring 18 is symmetrical, and it does not significantly displace the axis, Y, of inner ring 19. The inner ring 19 does not practically undergo deformation. The deformation is essentially absorbed by radial branches 24.

The distance, $D_R$, between the radial branches is at least slightly greater than the difference in the diameter, $D_I$, of the sleeve 4 and the diameter, $D_G$, of the bottom of the groove 17. The groove 17 in the bore sleeve 4 or 5 houses the outer ring 18. The radial branches 24 are connected with the ends 21 and the semi-circular parts 23 by large outer and "corner" curves 26, which measure approximately 1.5 millimeters.

Angle A at the center between the end faces 25 of the elongated element 27 is approximately 60°. The elongated element 27 is advantageously shaped like a wide strip, the width, L, of which is set in the direction of the thickness of the positioning unit, thus providing good rod guidance.

The elongated element 27 has a thickness E which is extremely small. For example, the thickness, E, is equal to the depth of the groove 17 which receives and houses the outer ring 18. This small thickness, for example 0.8 millimeters, facilitates its ability to form the proper shape. It also provides for no significant diminution of the passage section of the sleeve 4.

While the figures show thermostatic feeler 13 and positioning unit 15 disposed in sleeve 4, it will be appreciated that in an alternate embodiment the entire valve could be positioned so that positioning unit 15 and thermostatic feeler could be disposed in outlet sleeve 5 in a similar manner. The elongated element 27 can be manufactured of a suitable elastic material compatible with the fluid which flows in the sleeves 4 and 5. The elongated element 27 can also be manufactured of stainless steel.

Having described the invention in detail, those skilled in the art will appreciate that modifications may be made of the invention without departing from its spirit. Therefore, it is not intended that the scope of the invention be limited to the specific embodiments described. Rather, it is intended that the scope of this invention be determined by the appended claims and their equivalents.

What is claimed is:

1. A tap assembly comprising a body defining a chamber having an inlet and an outlet, and a seat therebetween, and a clapper disposed for movement relative to said seat between a first position of said clapper engaged upon said seat for resisting flow of fluid from the inlet toward the outlet, and a second position of said clapper spaced from engagement upon said seat for permitting flow of fluid from said inlet toward said outlet, said tap assembly further comprising:

a reciprocal positioning assembly comprising:

a rod mounted for axial movement between a first position of said rod for allowing the clapper to engage upon said seat and a second position of said rod for precluding said clapper from engaging upon said seat;

a cylindrical housing; and an elastically deformable elongated element which forms a split ring positioning unit for said rod, said split ring positioning unit comprising an inner ring and an outer ring.

2. The tap assembly of claim 1 further comprising pressure limiting means for driving said clapper toward said first position of said clapper.

3. The tap assembly of claim 1 or 2, wherein the outer ring of said split ring positioning unit cooperatively operates in a sleeve defined by said body.

4. The tap assembly of claim 3, wherein said sleeve defines a groove of predetermined depth which houses said outer ring.

5. The tap assembly of claim 1 or 2, wherein said rod cooperatively operates within said inner ring of said split ring positioning unit.

6. The tap assembly of claim 1 or 2, wherein ends of said elongated element which form said split ring positioning unit remain apart.

7. The tap assembly of claim 6, wherein the angle formed between a center axis of said split ring positioning unit and its ends is approximately 60 degrees.

8. The tap assembly of claim 1 or 2, wherein said elongated element which forms said split ring positioning unit further forms radial branches which connect said inner ring and said outer ring.

9. The tap assembly of claim 8, wherein intersections of said radial branches with said inner ring are characterized by wide angle, contoured, rounded off edges.

10. The tap assembly of claim 8, wherein spacing between said radial branches is greater than the difference between the diameter of said sleeve and the diameter of bottom of said groove.

11. The tap assembly of claim 1 or 2, wherein said elongated element is constructed of a wide strip.

12. The tap assembly of claim 11, wherein said elongated element is constructed such that its width dimension is parallel to the thickness dimension of said positioning assembly.

13. The tap assembly of claim 11, wherein the thickness of said elongated element is extremely small compared to the width dimension.

14. The tap assembly of claim 13, wherein the thickness of said elongated element is substantially equal to the predetermined depth of said groove.

* * * * *

UNITED STATES PATENT AND TRADEMARK OFFICE
CERTIFICATE OF CORRECTION

PATENT NO. : 5,280,877

DATED : January 25, 1994

INVENTOR(S) : Jean L. Huveteau

It is certified that error appears in the above-identified patent and that said Letters Patent is hereby corrected as shown below:

```
Col. 2, line 40, after "unit" insert a period.

Col. 2, line 47, after "ring" insert a period.

Col. 2, line 49, after "edges" insert a period.

Col. 3, line 44, "13 and" should be --end--.

Col. 3, line 49, after "inner," delete the comma.
```

Signed and Sealed this

Fourth Day of July, 1995

Attest:

BRUCE LEHMAN

*Attesting Officer*  *Commissioner of Patents and Trademarks*